No. 823,576. PATENTED JUNE 19, 1906.
C. R. ARNOLD.
PROCESS OF EXTRACTING METALS FROM THEIR ORES.
APPLICATION FILED DEC. 30, 1903.
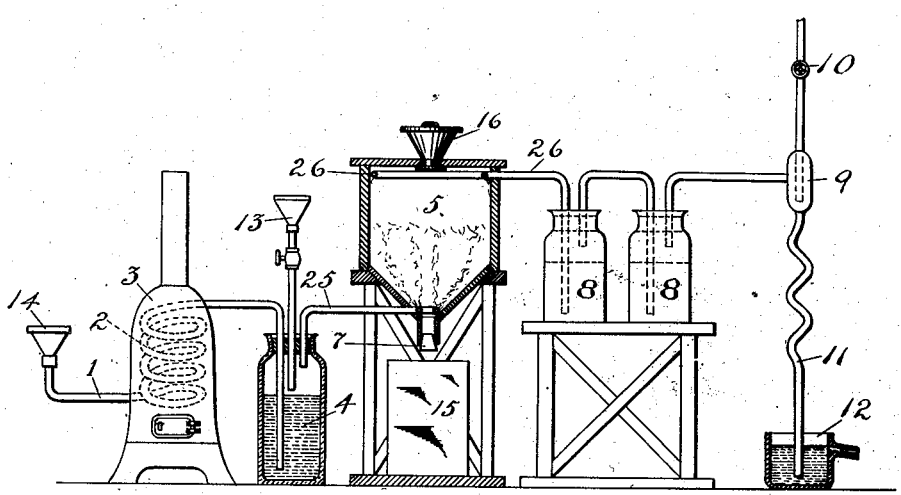
WITNESSES:
INVENTOR
Craig R. Arnold
BY
ATTORNEYS

UNITED STATES PATENT OFFICE.

CRAIG R. ARNOLD, OF PHILADELPHIA, PENNSYLVANIA.

PROCESS OF EXTRACTING METALS FROM THEIR ORES.

No. 823,576. Specification of Letters Patent. Patented June 19, 1906.

Application filed December 30, 1903. Serial No. 187,096.

*To all whom it may concern:*

Be it known that I, CRAIG R. ARNOLD, a citizen of the United States, and a resident of Philadelphia, in the county of Philadelphia and State of Pennsylvania, have invented a certain new and useful Improvement in Processes of Extracting Metals from their Ores, of which the following is a specification.

My invention relates to those processes of recovering gold, silver, and other precious metals known as the "cyanid" process and in which the ore or other metal-bearing substance moistened or mixed with cyanid salt is subjected to the action of an oxidizing agent like air.

The object of my present invention is to overcome the difficulties and objections to this process as heretofore conducted either by forcing air under plenum into the tank containing the ore to agitate the same or by the use of mechanical stirrers working in the pulp while the body of pulp is exposed to the atmosphere. In the process as heretofore conducted there is liability to the escape of hydrocyanic gas or other deleterious gases even though the process is conducted in a closed vat or tank, for the reason that when the air or gas is forced under plenum into the tank the pressure being higher than the outside atmospheric pressure any damage or leak in the outlet-pipes will permit the escape of the deleterious gases.

My invention has for its object not only to thoroughly remove the possibility of escape of the hydrocyanic-acid gas or any other deleterious gases into the atmosphere, but to also hasten the process; to which end my invention consists in the novel process or method of treating ores by the cyanid process by maintaining a vacuum at the outlet of a closed tank in which a pulp of the ore and a cyanid solution is contained, and thereby drawing air into the lower portion of the body of pulp in sufficient volume and at a proper point to thoroughly agitate the body of pulp, said air being passed first through a generator adapted to furnish a halogen gas and finally passing the gases removed from the tank by the exhaustion process through an absorption tank or vat and through a falling body of water before they are permitted to escape to the atmosphere.

My invention consists, further, in the other special processes or methods more particularly hereinafter described and then specified in the claims.

The advantages attendant upon my improved process are numerous. First, the rate of extraction of the ore is greatly increased; second, it becomes possible to dispense with the use of expensive apparatus, such as blowers, forcing the gas through the ore; third, air being itself an oxidizing agent frequently used the presence of a leak through which air may pass into the tank can do no harm; fourth, the treating-tank may be still used for an indefinite time even after leaks develop; fifth, by the use of a hydraulic vacuum-pump the waste gases may be caused to commingle with the waste waters and produce a harmless compound; sixth, should any leaks occur they can be readily stopped from the outside.

In carrying out this invention I prefer to employ the novel combination of apparatus hereinafter described and which is made the subject of an application for patent filed by me as a division of the present application.

The accompanying drawing illustrates diagrammatically an apparatus suitable for carrying on the process of treating the ore in a partial vacuum.

5 indicates the treating tank or vat, which may be of any desired form and is provided with a hopper through which the tank may be charged.

7 indicates the discharge-opening, through which the treated pulp is emptied into a settling-tank 15 or otherwise removed for recovery of the solution and separation of the metallic constituents thereof.

The tank is preferably made of conical form at its bottom to assist in the discharge of the pulp and, further, to facilitate the movement of the mass of pulp under the action of the stream of gas introduced into the mass of the pulp at the lower end of the tank through pipe 25, having a suitable opening or openings within the tank or vat.

26 is a suitable pipe opening into the gas-space at the top of the tank and through which the gas or gases therein are removed by suction produced by the action of a suitable pump, the function of which is to maintain a partial vacuum in the tank 5.

The pipe 25 communicates with any source of air or gas the pressure of which is preferably not higher than atmospheric pressure, so that, as will be obvious, the operation of the vacuum-pump connected with pipe 26 will serve to produce a partial vacuum in the tank 5 and will induce the flow of gas by suction through pipe 25 and up through the pulp in the tank 5.

As a means for maintaining a partial vacuum in the treating tank and pipe 26 or other passages by which the excess or waste gases are conducted away I prefer to employ a vacuum-pump 9, which may be of the well-known Sprengel type and preferably operated by water conducted thereto under pressure by a pipe provided with a stop-cock 10, said water being delivered through pipe 11 into the pot or tank 12, containing water in which the outlet of the pipe 11 is submerged.

It will be understood that the head of water in the exhaust-pump and the size of the pipes or passages through which the agitating air or gas passes must be sufficient to permit a sufficient volume of air to circulate through the body of pulp to thoroughly agitate the same.

By the use of a vacuum-pump of the water type having its outlet submerged, as described, I secure the advantage that the waste or excess gases passing from pipe 26 to and through the pump will commingle with the waste water and produce a harmless compound. Ordinarily, however, I prefer to interpose between the pump and the tank one or more absorption vats or tanks 8 of the ordinary type, in which the gas is caused to pass through a solution of material suitable for chemically uniting with the gas or gases taken from the tank, and so operating either to render the same harmless or to recover the same in suitable form to permit the recovered elements to be again employed in the treating-tank. Thus, for instance, in the cyanid process said absorption-tanks 8 might contain a material suitable for uniting with the hydrocyanic-acid gas generated in the treating-tank, in which case they would be preferably charged with some caustic solution, such as a solution of caustic soda, caustic lime, caustic potash, or any other caustic alkali or alkaline earth adapted to unite with or absorb hydrocyanic acid, thus producing a simple cyanid adapted to act as a solvent for gold, silver, or other metal-bearing ore or pulp undergoing treatment in the tank or vat 5.

The oxidizing agent is obtained by drawing atmospheric air by suction into the tank at the bottom thereof through the pipe 25, such air being caused to first pass through a suitable solution contained in the Woulfe bottle or tank 4 and of suitable character for generating bromin or other halogen element which it may be desired to use as the reducing gas or agent. The oxygen of the air constitutes the oxidizing element of the gas, which is drawn up through the pulp into the tank and which agitates the same. The generating material may be introduced into the bottle 4 through the funnel 13. Said bottle is preferably of glass, so that the quantity of such material can be observed. Preferably the air introduced into said bottle through pipe 1 is carried through the heater-coil 2 in a heater 3, and the pipe 1 may be provided with an inlet-funnel 14 for the introduction of any oxidizing or reducing agent. It will be understood also that the contents of the bottle 4 may be such as to produce other oxidizing or reducing agents besides bromin. Also, as will be obvious, when bromin is employed the absorption-tank 8 may be charged with a solution of alkali, which will combine with the bromin or other gas of the halogen group that may be passed through the pulp and escape by the pipe 26.

In the operation of the apparatus described the pulp in the tank 5 is mixed with a sufficient amount of solution to render it capable of being agitated or "stirred" by the action of the gases drawn up through the same from the pipe 25 to the space with which the pipe 26 communicates, and in which space the partial vacuum is maintained, as already described.

It will be seen that in my process the operation is not conducted under pressure of gas used for agitation, but under a partial vacuum in practically all the pipes or spaces in which the gas exists, whose escape is thus prevented even though there should be a defect or opening through which leakage would otherwise occur. This advantage applies obviously to the inlet as well to the exit pipe or space wherein the excess or waste gases resulting from the treatment exist. Moreover, it will be seen that by my process I thoroughly eliminate the possibilities of the escape of any deleterious gases into the atmosphere, because those gases, like hydrocyanic gas, which are drawn from the upper part of the tank are caused to pass through the absorption-tank containing the caustic solution and are thereby absorbed, while if by chance the said solution should fail to completely take up such gas the same, together with any other deleterious gases, will be taken up in the water column, through which they can only pass to the external atmosphere. Hence, as will be seen, I not only obviate the objections incident to the process and arising from the possibility of leakage or of escape of the deleterious gases freely into the atmosphere at the final outlet of the system, but I also am enabled to conduct the process in a thoroughly economical and efficient manner, because, first, the pulp is thoroughly agitated by the oxidizing air, while, secondly, the hydrocyanic gas evolved in the process is recovered and goes to make a cyanid salt useful in the operation.

What I claim as my invention is—

1. The herein-described process of recovering gold and silver from ores by the cyanid process, consisting in drawing air by suction first, through a generator of a halogen gas, then through a pulp containing the cyanid salts and in sufficient volume to thoroughly agitate the same and finally carrying the waste and resultant gases from the tank, first through an absorption tank or vat and then through a column of liquid before permitting any escape to the external atmosphere.

2. The herein-described improvement in recovering metals by the cyanid process, consisting in maintaining a partial vacuum in the gas-space above a pulp of the ore and a cyanid salt while contained in a suitable closed vessel, introducing air by the exhaust action thus produced in sufficient amount beneath the body of pulp to thoroughly agitate the same, passing the escape or waste gases passing from the tank by the vacuum maintained, through a caustic solution and finally delivering the remaining gases which pass through such solution, to a column of water employed in maintaining the vacuum.

3. The herein-described improvement in recovering metals by the cyanid process consisting in forming a pulp of the ore and a solution of a cyanid salt, agitating the pulp while contained in a closed vessel by drawing air through a heater and a generator of a halogen gas and then through the body of pulp by maintaining a partial vacuum in the gas-space above the pulp-body and passing the gases evolved in the pulp-containing tank by the vacuum maintained therein, through a caustic solution and an exhaust-pump of hydraulic type to the external atmosphere.

4. The herein-described process of extracting precious metals from their ores, consisting in forming a pulp of the ore and a cyanid solution drawing air through the pulp in sufficient amount to thoroughly agitate the ore-pulp by maintaining the vacuum in the space above the body of pulp and delivering the gases exhausted from the space above the pulp to a regenerating solution and to a column of water which maintains the vacuum, said solution and column being in series with one another.

5. The herein-described process of recovering precious metals, consisting in forming a pulp of the ore and a cyanid solution, maintaining the vacuum above the body of pulp by drawing air, first, through a heater and then through a generator of a halogen element, and finally through the body of pulp in sufficient quantity to agitate the same and delivering the air or gases exhausted from the tank to a column of liquid by which the vacuum is maintained.

Signed at Philadelphia, in the county of Philadelphia and State of Pennsylvania, this 21st day of December, A. D. 1903.

CRAIG R. ARNOLD.

Witnesses:
J. S. L. ALEXANDER,
NICHOLAS J. FITZGERALD.